United States Patent
Pasqualetto

(10) Patent No.: US 10,020,727 B2
(45) Date of Patent: Jul. 10, 2018

(54) CONTROL OF AN INDUCTIVE LOAD BY PULSE WIDTH MODULATION

(71) Applicant: Angelo Pasqualetto, Toulouse (FR)

(72) Inventor: Angelo Pasqualetto, Toulouse (FR)

(73) Assignees: CONTINENTAL AUTOMOTIVE FRANCE, Toulouse (FR);
CONTINENTAL AUTOMOTIVE GMBH, Hannover (DE)

( * ) Notice: Subject to any disclaimer, the term of this patent is extended or adjusted under 35 U.S.C. 154(b) by 870 days.

(21) Appl. No.: 14/374,311

(22) PCT Filed: Jan. 25, 2013

(86) PCT No.: PCT/EP2013/000229
§ 371 (c)(1),
(2) Date: Jul. 24, 2014

(87) PCT Pub. No.: WO2013/113485
PCT Pub. Date: Aug. 8, 2013

(65) Prior Publication Data
US 2015/0028840 A1 Jan. 29, 2015

(30) Foreign Application Priority Data
Jan. 31, 2012 (FR) ...................................... 12 00283

(51) Int. Cl.
*G05B 11/28* (2006.01)
*H02M 3/157* (2006.01)
(Continued)

(52) U.S. Cl.
CPC ............ *H02M 3/157* (2013.01); *H02M 3/158* (2013.01); *H02P 7/29* (2013.01); *F02D 11/10* (2013.01);
(Continued)

(58) Field of Classification Search
CPC ......... F25D 11/00; H02M 3/157; F25B 21/02; F25B 2321/0212; F25B 2321/0211
See application file for complete search history.

(56) References Cited

U.S. PATENT DOCUMENTS 6,031,708 A 12/2000 Guermeur
6,848,418 B1 2/2005 Summers
(Continued)

FOREIGN PATENT DOCUMENTS

CN 1216632 A 5/1999
FR 2 866 165 8/2005
(Continued)

OTHER PUBLICATIONS

International Search Report dated Feb. 18, 2014, corresponding to PCT/EP/2013/000229.

*Primary Examiner* — Shawki S Ismail
*Assistant Examiner* — Zoheb Imtiaz
(74) *Attorney, Agent, or Firm* — Young & Thompson

(57) ABSTRACT

Method and device for controlling an inductive load by pulse width modulation, on the basis of a periodic set point control signal having a given set point duty cycle. The set point control signal is, in each period of the set point control signal, in a first logic state determined from the high and low logic states for at least a first duration, and is in the other logic state during the rest of the period. Control signals are generated for activating the inductive load, on the basis of the set point control signal. With the aid of a first counter, the first duration (t0) is determined on the basis of the set point control signal. Via a second counter, a second duration (t0–td2) is determined, for which a logic signal corresponding to an effective control signal observed in the load is in the first determined logic state.

17 Claims, 4 Drawing Sheets

(51) Int. Cl.
*H02P 7/29* (2016.01)
*H02M 3/158* (2006.01)
H02M 3/155 (2006.01)
F02D 11/10 (2006.01)
F02D 41/20 (2006.01)

(52) U.S. Cl.
CPC ........... *F02D 2041/2027* (2013.01); *F02D 2041/2072* (2013.01); *H02M 2003/1555* (2013.01)

(56) References Cited

U.S. PATENT DOCUMENTS

| | | |
|---|---|---|
| 7,292,499 B2 | 11/2007 | Byun |
| 7,580,236 B2 | 8/2009 | Avian |
| 2004/0145963 A1 | 7/2004 | Byon |
| 2006/0244479 A1 | 11/2006 | Major |
| 2008/0272822 A1 | 11/2008 | Avian |
| 2010/0270998 A1* | 10/2010 | Caubert ............ H02M 7/53871 323/312 |

FOREIGN PATENT DOCUMENTS

| | | |
|---|---|---|
| JP | 2006/316714 | 11/2006 |
| KR | 2004/0066281 | 7/2004 |
| WO | 97/40509 | 10/1997 |
| WO | 2009/127902 | 4/2008 |

\* cited by examiner

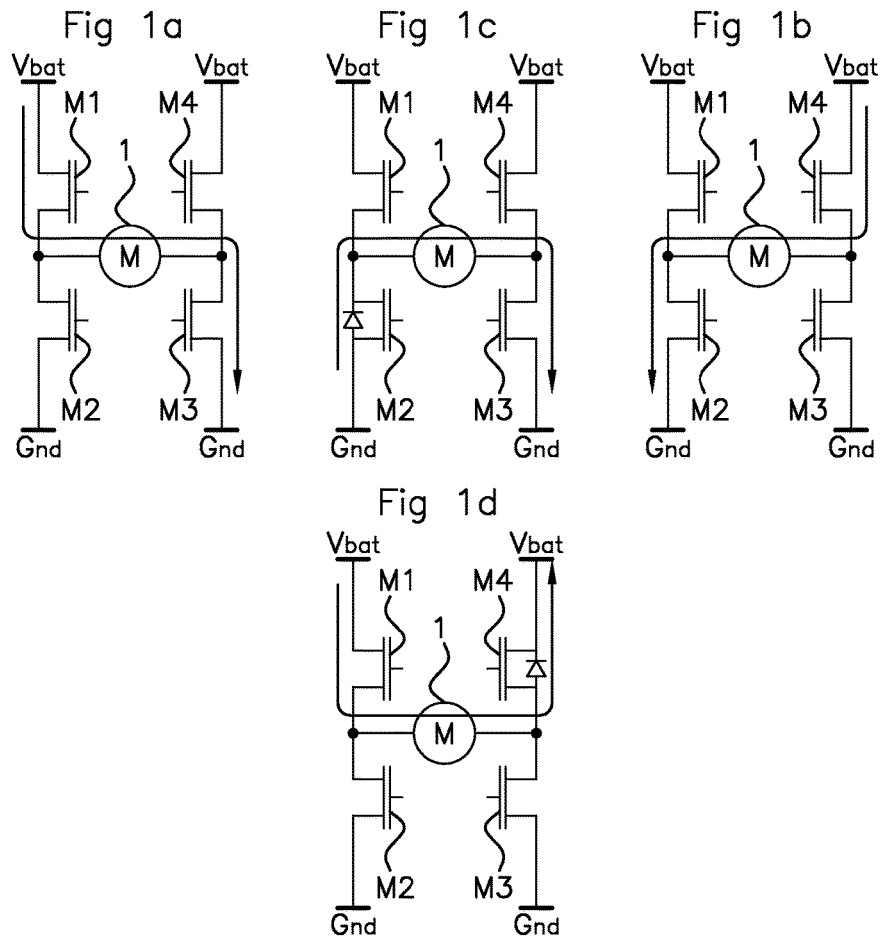
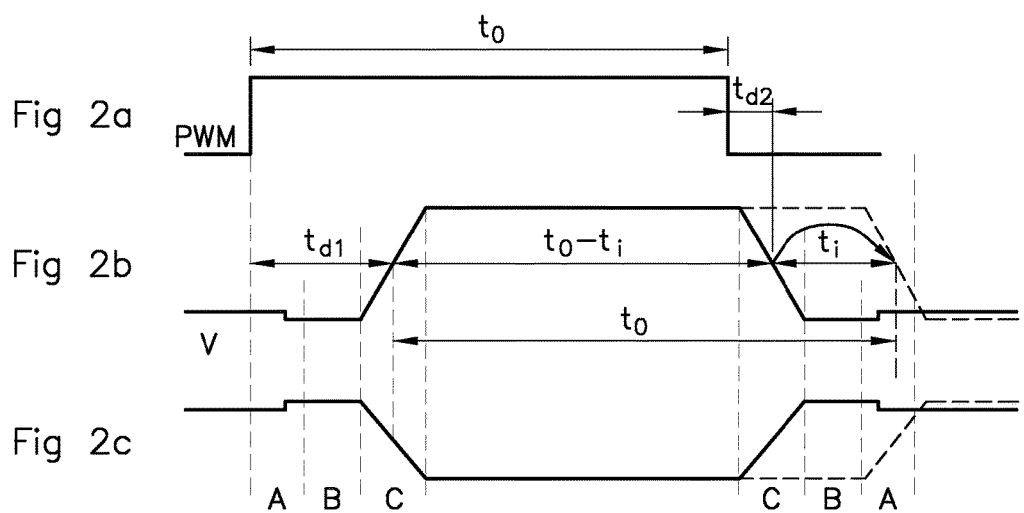

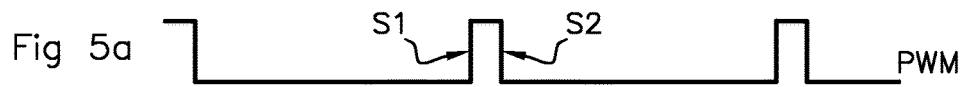
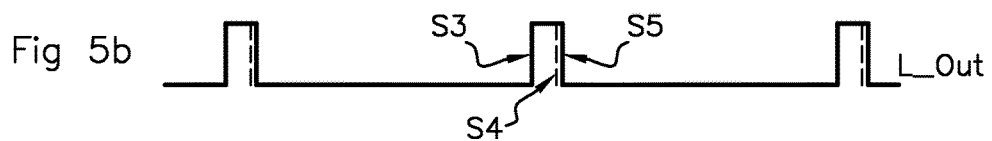
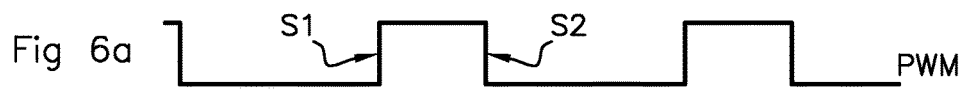
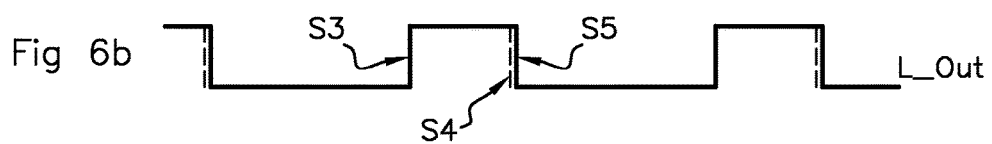
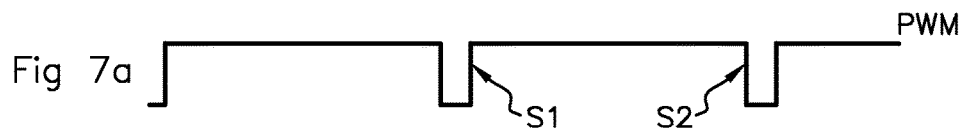
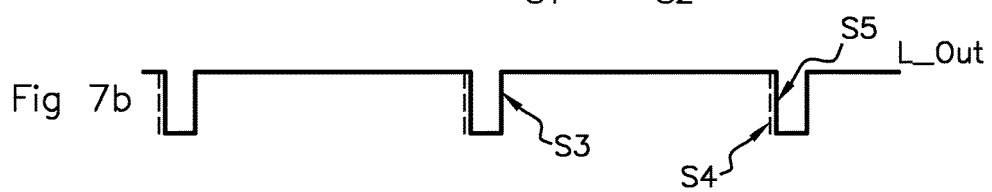
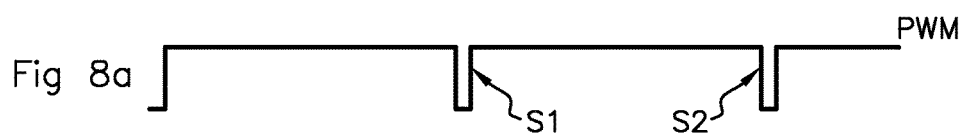
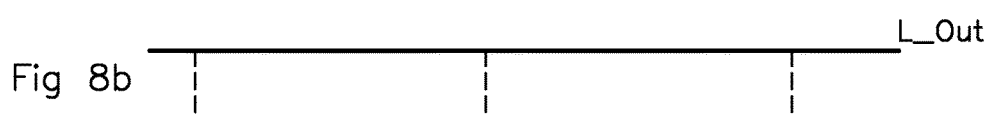

CONTROL OF AN INDUCTIVE LOAD BY PULSE WIDTH MODULATION

BACKGROUND OF THE INVENTION

The present invention relates to the control of inductive loads by pulse width modulation, and more specifically to a method and a device for this type of control.

The invention is suitable for application, in particular, in the automotive field, for example in electronic systems for controlling the position of the throttle valve (or "ETC" systems, standing for "Electronic Throttle Control"), or in gas recirculation (or "EGR" systems, standing for "Exhaust Gas Recirculation").

The control of inductive loads by pulse width modulation can be provided by means of an H-bridge structure, comprising four power switches, namely two "high side" switches and two "low side" switches. A first pair, formed by a first high side switch and a first low side switch, causes current to flow in the load in a first direction when these switches are closed. Conversely, a second pair, formed by the other high side switch and the other low side switch, causes current to flow in the load in the other direction. The two low side transistors, or the two high side transistors when they are closed together, causes the flow of what is known as a "freewheeling" current.

Each switch generally comprises a MOS power transistor (acronym for "Metal Oxide Semiconductor", in other words a field effect transistor with a metal oxide gate). A sequence of analog control signals of the four MOS transistors is provided by using a pulse width modulated set point control signal, the duty cycle of which can be used to control the amount of current injected into the load. Slow variations of current and voltage (called "slew rate") are created at the control gates of the MOS transistors, in order to avoid sudden switching which would cause electromagnetic disturbance.

Taking the switching sequence into account, the response of the MOS transistors is slower in the opening and in the closing of the switches. Consequently the effective duty cycle of the control signal at the terminals of the load is different from that of the set point control signal. More precisely, it is lower.

This difference is not particularly troublesome in applications in which the load is controlled in a closed loop, since in this case the system is able to adapt so as to provide the desired effective behavior in the load. This is the case, for example, when information relating to the angular position of a shutter controlled by an electric motor is sent by a sensor and is subject to appropriate slaving.

However, there are applications or situations in which the precision of the duty cycle is critical, and sometimes even in a closed loop system when it is desirable for this closed loop to be very fast.

In such a situation, the use of software could be proposed in order to compensate for the error in the duty cycle introduced by slow current and voltage variations (the slew rate), based for example on a table characterizing the behavior of the load and of its analog control means. However, this solution is tedious to implement and does not resolve the problem in all situations.

BRIEF SUMMARY OF THE INVENTION

The object of the invention is to overcome, or at least mitigate, all or some of the drawbacks of the aforementioned prior art.

For this purpose, a first aspect of the invention proposes a device for controlling an inductive load by pulse width modulation, in which, on the basis of a periodic set point control signal having a given set point duty cycle, said set point control signal is, in each period of said set point control signal, in a first logic state determined from the high and low logic states for at least a first duration, and is in the other logic state during the rest of the period, the device comprising:

a control unit arranged to generate control signals activating the inductive load, on the basis of the set point control signal and with current and voltage variations (slew rate);

a first counter arranged to determine the first duration on the basis of the set point control signal; and a second counter arranged to determine a second duration for which a logic signal corresponding to an effective control signal observed in the load is in the first determined logic state.

The device is also such that the control unit is configured to slave the second duration to the first duration.

According to another embodiment, the first counter and the second counter are replaced by an up-down counter arranged to count at the rate of the edges of a clock signal when only the set point control signal is in the first logic state, and to count down at the rate of the edges of said clock signal when only the logic signal is in said first logic state, the control unit being configured so that the up-down counter reaches a negative value.

In an improvement of the first embodiment, the first counter is arranged to count at the rate of the edges of a clock signal, starting from an edge of the set point control signal that causes said set point control signal to switch to the first logic state, and continuing to an edge of the set point control signal that causes said set point control signal to switch to the other logic state.

Advantageously, the control unit is configured to generate a signal resetting the first counter in response to the edge of the set point control signal that causes said set point control signal to switch to the other logic state, after the current count value of said first counter has been saved to a register.

According to another improvement, the second counter is arranged to count at the rate of the edges of a clock signal, starting from an edge of the logic signal corresponding to the effective control signal in the load that causes said logic signal to switch to the first logic state, and continuing to an edge of the logic signal that causes said logic signal to switch to the other logic state.

The control unit is also configured to generate a signal for resetting the second counter when the current count value of the second counter reaches the count value of the first counter saved to the register.

Advantageously, the control unit is also configured to generate control signals for deactivating the inductive load when the current count value of the second counter reaches the count value of the first counter saved to the register.

The invention also relates to a method for controlling an inductive load by pulse width modulation on the basis of a periodic set point control signal having a given set point duty cycle, where said set point control signal is, in each period of said set point control signal, in a first logic state determined from the high and low logic states for at least a first duration, and is in the other logic state during the rest of the period, the method comprising:

generating control signals activating the inductive load, on the basis of the set point control signal and with current and voltage variations (slew rate);

determining, with the aid of a first counter, the first duration on the basis of the set point control signal;

determining, by means of a second counter, a second duration for which a logic signal corresponding to an effective control signal observed in the load is in the first determined logic state; and slaving the second duration to the first duration.

Advantageously, the first counter counts at the rate of the edges of a clock signal, starting from an edge of the set point control signal that causes said set point control signal to switch to the first logic state, and continuing to an edge of the set point control signal that causes said set point control signal to switch to the other logic state.

The first counter is also reinitialized in response to the edge of the set point control signal that causes said set point control signal to switch to the other logic state, after the current count value of said first counter has been saved to a register.

Additionally, the second counter counts at the rate of the edges of a clock signal, starting from an edge of the logic signal corresponding to the effective control signal in the load that causes said logic signal to switch to the first logic state, and continuing to an edge of the logic signal that causes said logic signal to switch to the other logic state.

In an improvement of the invention, the second counter is reinitialized when the current count value of the second counter reaches the count value of the first counter saved to the register.

The control unit may also be configured in such a way that control signals are generated for deactivating the inductive load when the current count value of the second counter reaches the count value of the first counter saved to the register.

BRIEF DESCRIPTION OF THE DRAWINGS

Other characteristics and advantages of the invention will become more apparent in the light of the following description. This description is purely illustrative and is to be read with reference to the attached drawings, in which:

FIGS. 1a-1d are diagrams illustrating the control of an inductive load by pulse width modulation using an H-bridge;

FIGS. 2a-2c are chronograms of a set point control signal and of an effective control signal, respectively, for the control of a load such as that shown in FIG. 1;

FIGS. 5a and 5b are chronograms of a set point control signal and of an effective control logic signal, respectively, for a relatively low value of the duty cycle;

FIGS. 6a and 6b are chronograms of a set point control signal and of an effective control logic signal, respectively, for a frequently used value of the duty cycle;

FIGS. 7a and 7b are chronograms of a set point control signal and of an effective control logic signal, respectively, for a relatively high value of the duty cycle; and FIGS. 8a and 8b are chronograms of a set point control signal and of an effective control logic signal, respectively, for a value of the duty cycle very close to 100%.

DETAILED DESCRIPTION OF THE PREFERRED EMBODIMENTS

Figure 3A:
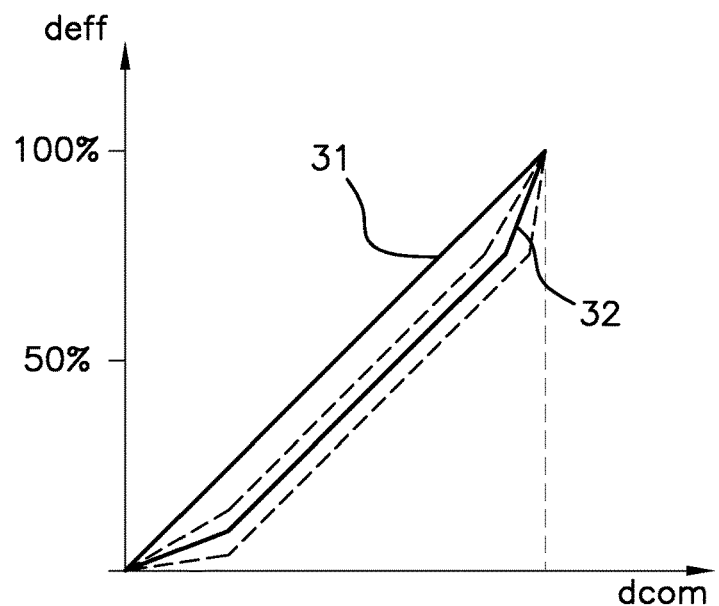
FIG. 3a is a graph showing the effective duty cycle in the load as a function of the set point duty cycle in the absence of the correcting device.

With reference to FIGS. 1a to 1d, a control device for an inductive load such as an electric motor 1 comprises, for example, a switch structure of the H-bridge type.

This switch structure comprises four switches, each formed, for example, by an MOS power transistor. A first transistor M1 is connected between a positive supply terminal, brought to the voltage of the battery Vbat, and a first terminal of the motor. A second transistor M2 is connected between said first terminal of the motor and a ground terminal Gnd. A third transistor M3 is connected between a second terminal of the motor and a ground terminal Gnd. Finally, a fourth transistor M4 is connected between the positive supply terminal Vbat and said second terminal of the motor. The transistors M1 and M4 are called "high side" transistors, and the transistors M2 and M3 are called "low side" transistors. The bridge can be controlled in four states, only three of which are necessary.

In a first state, the pair formed by the high side transistor M1 and the low side transistor M3 enables these transistors, when they are conducting (closed switches), to cause a current to flow through the motor 1 in a first direction, as indicated by an arrow in FIG. 1a. The transistors M2 and M4 are then blocked (open switches).

Conversely, in a second state, the pair formed by the low side transistor M2 and the high side transistor M4 enables these transistors, when they are conducting (closed switches), to cause a current to flow through the motor 1 in the other direction, as indicated by the arrow in FIG. 1b. The transistors M1 and M3 are then blocked (open switches).

In a third state shown in FIG. 1c, the high side transistors M1 and M4 are blocked (open switches) and the low side transistors M2 and M3 are conducting (closed switches). This enables the energy stored in the inductive load to be discharged in the form of a short-circuit current through M2 and M3, after the opening of the transistor M1, as shown by the arrow in FIG. 1c. This state is described as the "freewheeling" state. It can be established in succession to an operation of the H-bridge in the first or the second state. It should be noted that, after the opening of the transistor M1, and before the closing of the transistor M2, the current already flows in the structural diode of the transistor M2. This is a transient state that can be described as a passive freewheeling state.

Finally, in a fourth state shown in FIG. 1d, the low side transistors M2 and M3 are blocked (open switches) and the high side transistors M1 and M4 are conducting (closed switches). This enables the energy stored in the inductive load to be discharged in the form of a short-circuit current through M1 and M4, after the opening of the transistor M3, as shown by the arrow in FIG. 1d. This state is described as the "freewheeling" state. It can be established in succession to an operation of the H-bridge in the first or the second state. After the opening of the transistor M3, and before the closing of the transistor M4, passive freewheeling current already flows in the structural diode of the transistor M4.

The third and fourth state are equivalent in terms of forming a freewheel. In practice, one of them may be omitted.

It will be appreciated that the invention is not limited by the type of switch structure. Notably, it is also applicable to a half-bridge switch structure, or to a single power switch. Equally, the embodiment of the power switch or switches shown in FIGS. 1a to 1d is only a non-limiting example. These switches may each comprise another type of field effect transistor (FET), a bipolar junction transistor (BJT), or an insulated gate bipolar transistor (IGBT), in place of a MOS transistor. They may also comprise an assembly of these transistors, with other components if required, such as resistors, capacitors, etc.

The current in the load 1 is controlled by pulse width modulation of a periodic set point control signal having a given set point duty cycle, which is used to generate switching signals for the transistor bridge.

As shown in FIG. 2a, this set point control signal PWM is, in each period, in a first logic state determined from the high and low logic states for at least a first duration, and is in the other logic state during the rest of the period. In the example shown in the figure, the set point control signal PWM is in the high logic state during a period t0 which is shorter than the period T. The set point duty cycle dcom is given by:

$$dcom = t0/T \quad (1)$$

FIG. 2b corresponds to sequences created by the combination of FIGS. 1a and 1c. It shows the variation of the current I and the voltage V at the source of a transistor, for example the transistor M1, occurring in response to the set point control signal PWM of FIG. 2a.

FIG. 2c corresponds to sequences created by the combination of FIGS. 1a and 1d. It shows the variation of the voltage V at the source of a transistor, for example the transistor M3, occurring in response to the set point control signal PWM of FIG. 2a.

Because of the current and voltage variations (slew rate), the increases and decreases of the current I and the voltage V have gentle gradients, in place of the square edges of the set point control signal PWM. For example, the current variation may be about 3 A/μs, and the voltage variation may be about 3V/μs.

Each time that switching is caused by an edge of the set point control signal PWM, there is a sequence of three phases, namely the lag time A, the current variation B and the voltage variation C. The order of this sequence is not the same after a rising edge of the set point control signal PWM as it is after a falling edge of said signal.

The lag time A is introduced to prevent the short circuit that would be created by the conduction of two transistors connected to the same output (M1 and M2, or M3 and M4). During this lag time A, a passive freewheel is established (conduction through a transistor and a diode). The voltage therefore becomes slightly negative (FIG. 2b) or slightly higher than the battery voltage (FIG. 2c).

After a rising edge of the set point control signal PWM, there is initially a lag time A, followed by a current variation B and finally a voltage variation C. After a falling edge of the set point control signal PWM, there is initially a voltage variation C, followed by a current variation B and finally a lag time A. This creates a delay td1 in the rise of the voltage V at the control gate of the MOS transistor with respect to the rising edge of the set point control signal PWM. Conversely, the delay td2 in the fall of the voltage V with respect to the falling edge of the set point control signal PWM is shorter (td2<td1). Consequently, the duration for which the voltage at the source of the controlled MOS transistor is greater than half of the high voltage Vbat is equal to t0−td1+td2, instead of t0. In other words, using deff to denote the duty cycle of the effective control signal in the load, we find:

$$deff < dcom \quad (2)$$

which shows that the duty cycle of the effective control signal (corresponding to the voltage V) is smaller than the duty cycle of the set point control signal PWM.

The difference between the delays ti=td1−td2 implies a reduction in the time for which the effective control signal in the load is in the high state (corresponding to a level higher than half of the battery voltage Vbat), with respect to the duration t0 for which the set point control signal PWM is in the high logic state. In practice, this reduction may be of the order of several μs, for example 5 to 10 μs, or possibly slightly more.

The set point duty cycle may vary between 0% and 100%; the effective duty cycle is, for example, allowed to have an absolute deviation of 5%, that is to say 45% or 55% if the set point duty cycle is 50%.

On the graph of FIG. 3a, the curve 32 shows in a schematic manner the values of the effective duty cycle deff as a function of the values of the set point duty cycle dcom. The ideal relationship between these values would be an equal relationship represented by a straight line 31, inclined at 45° and passing through the origin of the graph. In this case, the curve 32 is shifted toward the right with respect to the straight line 31, to an extent which depends on the difference between the delays ti. The value of this shift may also vary within certain limits represented by curves in broken lines on either side of the curve 32, because of the dispersions and variations of characteristics of the components, these variations being essentially due to the temperature, but also to the ageing, and because of the dispersion between components. Because of this variation, any correction at the software level as mentioned in the introduction will be imperfect.

The reduction of the effective duty cycle deff with respect to the set point duty cycle dcom may be acceptable at relatively low frequencies of the set point control signal PWM, of the order of 1 kHz for example. This is because, at this frequency, the set point control signal PWM has a period of 1 ms, so that the difference between the delays ti due to the switching time of the MOS transistors is negligible, as it represents an acceptable error in the duty cycle. For example, if ti=10 μs, then the error is 1%.

However, at higher frequencies, of the order of 10 kHz for example, this reduction makes it difficult to comply with a margin of error of less than 5% on the effective duty cycle deff, even if software compensation is implemented as mentioned in the introduction.

For this reason, the proposed control system is of the above type, but is one in which the time for which the effective control signal is in the high logic state is slaved, so that it corresponds to the time for which the set point control signal is in the same high logic state.

Figure 4A:
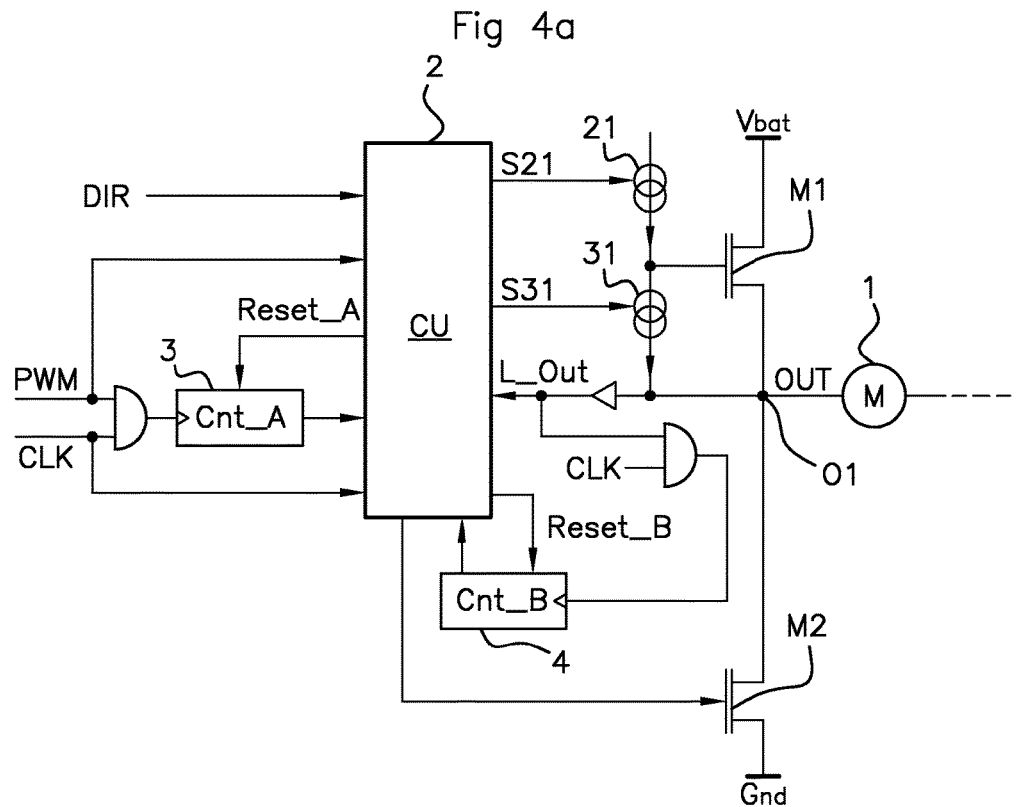
FIG. 4a is a functional diagram of an example of a control device according to a first embodiment.
Figure 4B:
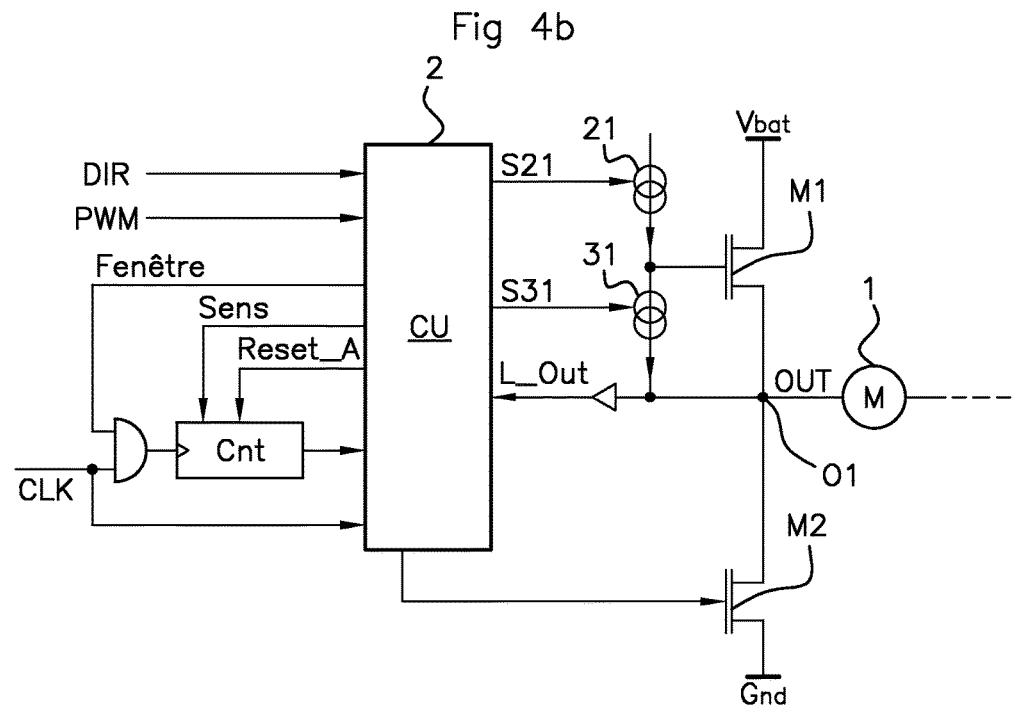
FIG. 4b is a functional diagram of an example of a control device according to another embodiment.

Two embodiments of a control device are shown schematically in FIGS. 4a and 4b respectively.

Figure 3B:
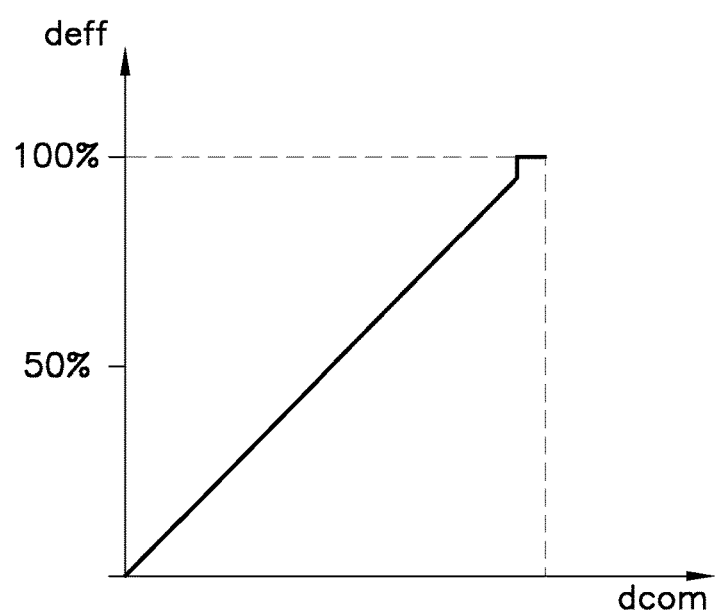
FIG. 3b is a graph showing the effective duty cycle in the load as a function of the set point duty cycle in the presence of the correcting device.

The graph of FIG. 3b shows the variation of the effective duty cycle deff as a function of the control duty cycle dcom in the presence of the correcting device. A slight deviation occurs for duty cycles close to 100%.

The device of FIG. 4a comprises a control unit 2, for example a microcontroller, an ASIC ("Application Specific Integrated Circuit", that is to say an integrated circuit dedicated to a specific application), a microprocessor, an SoC ("System on Chip", that is to say a single-chip system), or the like. The control unit 2 receives at its input control signals PWM and DIR, together with a clock signal CLK. At its output, it delivers control signals for the MOS transistors of the H-bridge supplying the motor 1, of which only the transistors M1 and M2 of FIGS. 1a to 1d are shown here, for the sake of the clarity of the figure and the brevity of the present description. Similarly, the means of voltage and current variation (slew rate) will not be described in detail, except for the transistor M1 (note that this device may be located at the gate of the transistor M2 instead of that of the transistor M1). These means comprise a controlled current source 21 and a controlled current source 31, arranged, respectively, to charge and discharge the control gate of the transistor M1. The sources 21 and 31 are controlled, respectively, by a signal S21 and by a signal S31 generated by the control unit 2.

On the input side of the control unit 2, the signal DIR is, for example, a binary logic signal which controls the direction of rotation of the motor, that is to say the direction of flow of the current through the H-bridge (see FIGS. 1a and 1b). The set point control signal PWM and its set point duty cycle dcom determine the current supplied to the load, and therefore the speed and/or the torque of the motor 1.

The device also comprises a first counter 3 having a clock input, a resetting input, and the counting outputs (represented symbolically as a single output). The clock input receives a logic signal resulting from the logical combination of the set point control signal PWM and the clock signal CLK of the device in a logic gate, of the AND type for example. The resetting input receives a signal Reset_A, supplied by the control unit 2, for resetting the value of the first counter 3. The resetting signal Reset_A is activated by the control unit 2, to reinitialize the first counter 3, before or not later than the reception of a rising edge of the set point control signal PWM.

Thus arranged, the first counter 3 is adapted to count at the rate of the clock signal CLK during the time interval in which the set point control signal PWM is in the high logic state, and therefore to measure the duration t0 of this interval (see FIG. 2a). This duration, available in the form of the count value of the first counter 3 when the set point control signal PWM returns to the low logic state, is then acquired by the control unit 2. It is stored in a register of the latter. The first counter 3 is then reinitialized by the control unit 2, by the activation of the resetting signal Reset_A.

On the output side of the control unit 2, the node through which the source of the transistor M1 is connected to a terminal of the motor 1 is denoted O1. The voltage on this node (denoted V in FIG. 2b) corresponds to an analog signal OUT. This signal transfers the control signal to the load. It has the effective duty cycle deff mentioned above. A "voltage level adaptation" port supplies a logical version L_Out of this signal to the control unit 2, with voltage levels corresponding to the high and low logic states accepted by this control unit 2. In other words, the effective control logic signal L_Out is in the high logic state when the voltage V (the signal OUT) is more than half of the voltage of the battery Vbat, and is in the low logic state when the voltage V (the signal OUT) is less than half of the voltage of the battery Vbat.

The device also comprises a second counter 4 having a clock input, a resetting input, and an output. The clock input receives a logic signal resulting from the logical combination of the effective control logic signal L_Out and the clock signal CLK of the device in a logic gate, of the AND type for example. The resetting input receives a signal Reset_B, supplied by the control unit 2, for resetting the value of the counter. The signal Reset_B is activated by the control unit 2, as detailed below.

Thus arranged, the second counter 4 is adapted to count at the rate of the signal CLK during the period of time in which the effective control logic signal L_Out is in the high logic state, and therefore to measure the duration of this period (denoted t0-31 ti in FIG. 2b). A delay td2 in the opening of the transistor M2 must be allowed for. This delay is compensated for by the fact that the initial value of the first counter 3 is td2. This value is taken from the preceding period of the set point control signal PWM. It is available in the form of the count value of the second counter 4, and is acquired continuously by the control unit 2, for example on each rising edge of the clock signal CLK.

The control unit 2 is configured, by software for example, to keep the transistor M1 conducting with the aid of the signals S21 and S31, so that the duration measured with the aid of the second counter 4 corresponds the value t0 measured with the aid of the first counter 3 and stored in a register. In other words, the time for which the effective control signal in the load (i.e. at the source of the transistor M1) is kept in the high state (corresponding to a level higher than half of the battery voltage Vbat) is slaved to the duration t0. This is equivalent to compensating for the delay td by prolonging the duration of the effective control signal pulse V, as represented in broken lines on the right of FIG. 2b.

The operation of the device will now be described with reference to the timing charts of FIGS. 5a-5b, 6a-6b, 7a-7b and 8a-8b. FIGS. 5a and 5b are, respectively, timing charts of the set point control signal PWM and of the effective control logic signal L_Out for a relatively low value of the duty cycle, that is to say a value close to 10% in this case. FIGS. 6a and 6b are, respectively, timing charts of the set point control signal PWM and of the effective control logic signal L_Out for a frequently used value of the duty cycle, that is to say a value close to 35% in this case. FIGS. 7a and 7b are, respectively, timing charts of the set point control signal PWM and of the effective control logic signal L_Out for a relatively high value of the duty cycle, that is to say a value close to 90% in this case. FIGS. 8a and 8b are, respectively, timing charts of the set point control signal PWM and of the effective control logic signal L_Out for a value of the duty cycle close to 100%.

Considering the case of FIGS. 6a and 6b initially, a measurement of the duration t0 for which the set point control signal PWM is in the high logic state starts, in step S1, when the set point control signal PWM switches to the high logic state, in other words on a rising edge of the set point control signal PWM. The control unit 2 also controls the control signals S21 and S31 so as to cause the transistor M1 to close, with the desired current and voltage variation (slew rate). The aforementioned measurement is made by the first counter 3, starting from a zero count value, initialized before the rising edge of the set point control signal PWM for the period in question, as explained below. The measurement ceases at step S2, when the set point control signal PWM returns to the low logic state. The value of t0 is then acquired by the control unit 2 and stored in a register of the latter. The first counter 3 is then reinitialized by the control unit 2, by the activation of the signal Reset_A, before or not later than the rising edge of the set point control signal PWM, providing the zero starting value for the count in the next period of the set point control signal PWM.

In parallel, a measurement of the duration for which the voltage V (the signal OUT) must be kept above half of Vbat starts, at step S3, when the effective control logic signal L_Out switches to the high logic state, in other words on a rising edge of the effective control logic signal L_Out. Thus the measurement starts at the effective instant when the transistor M1 becomes conducting (switch closed).

More precisely, the duration for which the voltage V (the signal OUT) must be kept above half of Vbat corresponds to t0, but the duration for which the control signals S21 and S31 must be controlled to keep the transistor M1 conducting (switch closed) corresponds to this duration t0 minus the difference, denoted ti, between the switching delays of the transistor M1 at opening, that is to say at t0–ti.

The measurement made by the second counter 4 starts from a non-zero value corresponding to the value td2 of the switching delay at the opening of the transistor M1. This is achieved in a way which will be understood in the light of the following text. The count value of the second counter 4 is then continuously acquired by the control unit 2 at each edge of the clock signal CLK, and is compared with the value of t0 which is measured with the aid of the first counter 3 and which is stored in the aforementioned register of the control unit 2.

When, at step S4, the count value of the second counter 4 is equal to t0, the control unit 2 controls the control signals S21 and S31 so as to cause the blocking of the transistor M1 (the opening of the transistor). The voltage V (the signal OUT) at the source of M1 then falls toward the ground potential Gnd. At the same time, the second counter 4 is reinitialized by the control unit 2, by the activation of the resetting signal Reset_B.

However, the counting by the second counter 4 does not necessarily stop. It only stops, at step S5, when the effective control logic signal L_Out returns to the low logic state, that is to say when the voltage V (the signal OUT) on the terminal of the load (which also corresponds to the source of M1) falls below half of the battery voltage Vbat. At this instant, the value of the second counter 4 then corresponds to the switching delay td2 of M1. The value of this delay td2 is therefore pre-loaded into the second counter 4 for the count in the next cycle, i.e. for the next period of the set point control signal PWM.

Evidently, the opening of the switch implemented by the transistor M1 is advanced by a duration td2 corresponding to the delay in the cut-off of said transistor M1 in such a way that the effective closing time of the switch is actually equal to t0.

In a first variant embodiment, the delay in the cut-off td2 is not measured, but it may be allowed for by the software controlling the control unit 2 on the basis of a fixed value. This fixed value may be obtained, for example, by a step of characterization of the device which may be performed in the laboratory in the design phase of the device. This embodiment is simpler, but gives less satisfactory results.

In another variant, the cut-off delay td2 may be measured by a counter other than the second counter 4. This solution yields better results than the first variant above, notably because it allows for the effective characteristics of the components. However, it is still less effective than the preferred embodiment described above with reference to FIG. 4a, since the allowance for the effects of temperature variation is not so satisfactory.

It should be noted that, in the case illustrated in FIGS. 6a-6b, as well as in the case illustrated in FIGS. 7a-7b, the step S3 may take place before the step S2. In this case, an internal software, provided for example by the control software of the microcontroller, prevents the execution of the comparison between the value of the second counter 4 until step S2 takes place. This is because, until this moment, the value t0 of the current period of the set point control signal PWM is not available in the register of the control unit 2.

The above description has been given solely by way of illustration, and does not limit the scope of the invention. Any technically feasible variant embodiment may be preferred to the embodiments described. In particular, the counters 3 and 4 and the logic gates associated with their operation may be provided within a microcontroller, for example, which implements the control unit 2.

For example, the embodiment illustrated in FIG. 4b, although substantially different, is only an improvement of the embodiment shown in FIG. 4a.

The device of FIG. 4b uses the same elements 21, 31, M1, M2, and 1 as that of FIG. 4a. The control unit 2 is still present, but has a different function. The signals PWM and DIR, together with L_OUT, can be used to control the signals Fenêtre, Sens and Reset_A, in order to operate an up-down counter 5 replacing the first counter 3 of FIG. 4a in the following manner:

The signal Fenêtre allows a count to take place, by allowing or preventing the passage of a clock signal CLK by means of an AND gate, in the up-down counter 5. The count takes place if the set point control signal PWM is in the high state while the signal L_OUT is in the low state, and the signal Fenêtre is then in the high state.

The downward count takes place if the set point control signal PWM is in the low state while the signal L_OUT is in the high state, and the signal Fenêtre is then also in the high state.

There is neither an upward nor a downward count if the set point control signal PWM and the signal L_OUT are in the same state, the signal Fenêtre then being in the low state.

The signal Sens is used for setting the up-down counter to upward or downward counting 5. When the up-down counter 5 reaches 0, when counting downward, the opening sequence of M1 is triggered. As mentioned above, there is then a delay td2 during which the up-down counter 5 continues to count downward, and the value reached represents a negative value of –td2, which is deducted during the next count.

The advantages of FIG. 4b compared with the embodiment of FIG. 4a are that a single counter is used in place of two, and the counting capacity required is much smaller, since it is sufficient to measure the longest of the delays, namely td1, instead of measuring the duration t0, which may be as much as a full period.

The comparison of the voltage level at O1 with respect to half the battery voltage Vbat may be simplified, at the cost of a slight loss of precision; for example, with reference to FIG. 2a, by considering the end of the voltage variations at O1 as the event at the start or end of counting, instead of taking the average of the voltage variation. It would be equally suitable to replace this average with the starts of voltage variation.

The invention claimed is:

1. A device for controlling an inductive load by pulse width modulation, in which, on the basis of a periodic set point control signal (PWM) having a given set point duty cycle (dcom), said set point control signal (PWM) is, in each period of said set point control signal (PWM), in a first logic state determined from the high and low logic states for at least a first duration (t0), and is in the other logic state during the rest of the period, the device comprising:

a control unit (2) arranged to generate control signals (S21, S31) activating the inductive load, on the basis of the set point control signal (PWM) and with current and voltage variations (slew rate);

a first counter (3) arranged to determine the first duration (t0) on the basis of the set point control signal (PWM); and a second counter (4) arranged to determine a second duration (t0-td2) for which a logic signal (L_Out) corresponding to an effective control signal (V, OUT) observed in the load (O1) is in the first determined logic state, wherein the control unit (2) is configured to slave the second duration to the first duration, and wherein the first counter (3) and the second counter (4) are replaced by an up-down counter (5) arranged to count at the rate of the edges of a clock signal (CLK) when only the set point control signal is in the first logic state, and to count downward at the rate of the edges of said clock signal (CLK) when only the logic signal (L_Out) is in said first logic state, the control unit (2) being configured so that the up-down counter (5) reaches a negative value.

2. A device for controlling an inductive load by pulse width modulation, in which, on the basis of a periodic set point control signal (PWM) having a given set point duty cycle (dcom), said set point control signal (PWM) is, in each period of said set point control signal (PWM), in a first logic state determined from the high and low logic states for at least a first duration (t0), and is in the other logic state during the rest of the period, the device comprising:

a control unit (2) arranged to generate control signals (S21, S31) activating the inductive load, on the basis of the set point control signal (PWM) and with current and voltage variations (slew rate);

a first counter (3) arranged to determine the first duration (t0) on the basis of the set point control signal (PWM); and a second counter (4) arranged to determine a second duration (t0-td2) for which a logic signal (L_Out) corresponding to an effective control signal (V, OUT) observed in the load (O1) is in the first determined logic state, wherein the control unit (2) is configured to slave the second duration to the first duration, and wherein the first counter (3) is arranged to count at the rate of the edges of a clock signal (CLK), starting from an edge of the set point control signal (PWM) that causes said set point control signal (PWM) to switch to the first logic state, and continuing to an edge of the set point control signal (PWM) that causes said set point control signal (PWM) to switch to the other logic state.

3. The device as claimed in claim 2, wherein the control unit (2) is configured to generate a signal (Reset A) resetting the first counter (3) in response to the edge of the set point control signal (PWM) that causes said set point control signal (PWM) to switch to the other logic state, after the current count value of said first counter (3) has been saved to a register.

4. The device as claimed in claim 3, wherein the control unit (2) is configured to generate a signal (Reset_B) for resetting the second counter (4) when the current count value of the second counter (4) reaches the count value of the first counter (3) saved to the register.

5. The device as claimed in claim 4, wherein the control unit (2) is also configured to generate control signals (S21, S31) for deactivating the inductive load when the current count value of the second counter (4) reaches the count value of the first counter (3) saved to the register.

6. The device as claimed in claim 2, wherein the second counter (4) is arranged to count at the rate of the edges of a clock signal (CLK), starting from an edge of the logic signal (L_Out) corresponding to the effective control signal (OUT) in the load that causes said logic signal (L_Out) to switch to the first logic state, and continuing to an edge of the logic signal (L_Out) that causes said logic signal to switch to the other logic state.

7. The device as claimed in claim 3, wherein the second counter (4) is arranged to count at the rate of the edges of a clock signal (CLK), starting from an edge of the logic signal (L_Out) corresponding to the effective control signal (OUT) in the load that causes said logic signal (L_Out) to switch to the first logic state, and continuing to an edge of the logic signal (L_Out) that causes said logic signal to switch to the other logic state.

8. A device for controlling an inductive load by pulse width modulation, in which, on the basis of a periodic set point control signal (PWM) having a given set point duty cycle (dcom), said set point control signal (PWM) is, in each period of said set point control signal (PWM), in a first logic state determined from the high and low logic states for at least a first duration (t0), and is in the other logic state during the rest of the period, the device comprising:

a control unit (2) arranged to generate control signals (S21, S31) activating the inductive load, on the basis of the set point control signal (PWM) and with current and voltage variations (slew rate);

a first counter (3) arranged to determine the first duration (t0) on the basis of the set point control signal (PWM); and a second counter (4) arranged to determine a second duration (t0-td2) for which a logic signal (L_Out) corresponding to an effective control signal (V, OUT) observed in the load (O1) is in the first determined logic state, wherein the control unit (2) is configured to slave the second duration to the first duration, and wherein the second counter (4) is arranged to count at the rate of the edges of a clock signal (CLK), starting from an edge of the logic signal (L_Out) corresponding to the effective control signal (OUT) in the load that causes said logic signal (L_Out) to switch to the first logic state, and continuing to an edge of the logic signal (L_Out) that causes said logic signal to switch to the other logic state.

9. The device as claimed in claim 8, wherein the control unit (2) is configured to generate a signal (Reset_B) for resetting the second counter (4) when the current count value of the second counter (4) reaches the count value of the first counter (3) saved to the register.

10. A method for controlling an inductive load by pulse width modulation on the basis of a periodic set point control signal (PWM) having a given set point duty cycle (dcom), where said set point control signal (PWM) is, in each period of said set point control signal (PWM), in a first logic state determined from the high and low logic states for at least a first duration (t0), and is in the other logic state during the rest of the period, the method comprising:

generating control signals (S21, S31) activating the inductive load, on the basis of the set point control signal (PWM) and with current and voltage variations (slew rate);

determining, with the aid of a first counter (3), the first duration (t0) on the basis of the set point control signal (PWM);

determining, by means of a second counter (4), a second duration (t0–td2) for which a logic signal (L_Out) corresponding to an effective control signal (V, OUT) observed in the load (O1) is in the first determined logic state; and slaving the second duration (t0–td2) to the first duration (t0), wherein the first counter (3) counts at the rate of the edges of a clock signal (CLK), starting from an edge of the set point control signal (PWM) that causes said set point control signal (PWM) to switch to the first logic state, and continuing to an edge of the set point control signal (PWM) that causes said set point control signal (PWM) to switch to the other logic state.

11. The method as claimed in claim 10, wherein the first counter (3) is reinitialized in response to the edge of the set point control signal (PWM) that causes said set point control signal (PWM) to switch to the other logic state, after the current count value of said first counter (3) has been saved to a register.

12. The method as claimed in claim 10, wherein the second counter (4) is reinitialized when the current count value of the second counter (4) reaches the count value of the first counter (3) saved to the register.

13. The method as claimed in claim 12, wherein the control unit (2) is also configured in such a way that control signals (S21, S31) are generated for deactivating the inductive load when the current count value of the second counter (4) reaches the count value of the first counter (3) saved to the register.

14. The method as claimed in claim 10, wherein the second counter (4) counts at the rate of the edges of a clock signal (CLK), starting from an edge of the logic signal (L_Out) corresponding to the effective control signal (OUT) in the load that causes said logic signal to switch to the first logic state, and continuing to an edge of the logic signal (L_Out) that causes said logic signal (L_Out) to switch to the other logic state.

15. The method as claimed in claim 11, wherein the second counter (4) counts at the rate of the edges of a clock signal (CLK), starting from an edge of the logic signal (L_Out) corresponding to the effective control signal (OUT) in the load that causes said logic signal to switch to the first logic state, and continuing to an edge of the logic signal (L_Out) that causes said logic signal (L_Out) to switch to the other logic state.

16. The method as claimed in claim 11, wherein the second counter (4) is reinitialized when the current count value of the second counter (4) reaches the count value of the first counter (3) saved to the register.

17. A method for controlling an inductive load by pulse width modulation on the basis of a periodic set point control signal (PWM) having a given set point duty cycle (dcom), where said set point control signal (PWM) is, in each period of said set point control signal (PWM), in a first logic state determined from the high and low logic states for at least a first duration (t0), and is in the other logic state during the rest of the period, the method comprising:

generating control signals (S21, S31) activating the inductive load, on the basis of the set point control signal (PWM) and with current and voltage variations (slew rate);

determining, with the aid of a first counter (3), the first duration (t0) on the basis of the set point control signal (PWM);

determining, by means of a second counter (4), a second duration (t0–td2) for which a logic signal (L_Out) corresponding to an effective control signal (V, OUT) observed in the load (O1) is in the first determined logic state; and slaving the second duration (t0–td2) to the first duration (t0), wherein the second counter (4) counts at the rate of the edges of a clock signal (CLK), starting from an edge of the logic signal (L_Out) corresponding to the effective control signal (OUT) in the load that causes said logic signal to switch to the first logic state, and continuing to an edge of the logic signal (L_Out) that causes said logic signal (L_Out) to switch to the other logic state.

\* \* \* \* \*